(12) United States Patent
Ferenczi

(10) Patent No.: US 12,694,400 B2
(45) Date of Patent: Jul. 28, 2026

(54) PRIVACY-PRESERVING DECENTRALIZED PAYMENT INSTRUMENT NETWORK

(71) Applicant: AMERICAN EXPRESS TRAVEL RELATED SERVICES COMPANY, INC., New York, NY (US)

(72) Inventor: Andras L. Ferenczi, Peoria, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 1073 days.

(21) Appl. No.: 16/861,701

(22) Filed: Apr. 29, 2020

(65) Prior Publication Data

US 2021/0342830 A1      Nov. 4, 2021

(51) Int. Cl.
| | |
|---|---|
| *G06Q 20/40* | (2012.01) |
| *G06Q 20/38* | (2012.01) |
| *G06Q 20/42* | (2012.01) |
| *H04L 9/32* | (2006.01) |

(52) U.S. Cl.
CPC ....... *G06Q 20/401* (2013.01); *G06Q 20/3827* (2013.01); *G06Q 20/3829* (2013.01); *G06Q 20/42* (2013.01); *H04L 9/3218* (2013.01)

(58) Field of Classification Search
CPC .......... G06Q 20/401; G06Q 20/00–425; H04L 9/00–50
USPC .......................................................... 705/75
See application file for complete search history.

(56) References Cited

U.S. PATENT DOCUMENTS

| | | | | |
|---|---|---|---|---|
| 10,652,019 | B1 * | 5/2020 | Nicolas | .................. H04L 9/3239 |
| 10,984,417 | B2 * | 4/2021 | Wang | ................... G06Q 20/401 |

| | | | | |
|---|---|---|---|---|
| 11,188,907 | B1 * | 11/2021 | Vijayvergia | ......... G06Q 20/023 |
| 2017/0132620 | A1 | 5/2017 | Miller et al. | |
| 2017/0132625 | A1 | 5/2017 | Kennedy | |
| 2017/0149796 | A1 * | 5/2017 | Gvili | ................... H04L 63/0428 |
| 2017/0244721 | A1 | 8/2017 | Kurian et al. | |
| 2018/0139165 | A1 * | 5/2018 | Xing | ....................... H04L 51/52 |
| 2019/0303931 | A1 * | 10/2019 | Valencia | ................... H04L 9/50 |

(Continued)

FOREIGN PATENT DOCUMENTS

| | | |
|---|---|---|
| KR | 1020200041290 | 4/2020 |
| WO | 2019108358 | 6/2019 |

OTHER PUBLICATIONS

International Search Report mailed in PCT/US2021/028079 mailed Aug. 6, 2021.

*Primary Examiner* — Ari Shahabi

(74) *Attorney, Agent, or Firm* — Thomas | Horstemeyer, LLP

(57)      ABSTRACT

Disclosed are various embodiments for providing a privacy-preserving decentralized payment instrument network that allows merchants and transaction account issuers to record transaction-related information in a distributed ledger. In particular, upon receiving authorization from a transaction account issuer to proceed with a transaction, a merchant can securely record transaction data (e.g., transaction confirmation identifier, transaction details, etc.) associated with the transaction in the distributed ledger. Furthermore, upon payment by the issuer to the merchant with regard to the transaction, the issuer can record payment confirmation data on the distributed ledger. The records stored in the distributed ledger can be used to resolve disputes between the parties without third-party intervention or sharing of privacy data.

20 Claims, 5 Drawing Sheets

(56) References Cited

U.S. PATENT DOCUMENTS

| 2020/0067907 | A1* | 2/2020 | Avetisov | ............... | H04L 67/133 |
| 2021/0042746 | A1* | 2/2021 | Westland | ............ | G06F 16/2379 |
| 2021/0192476 | A1* | 6/2021 | Swaminathan | ......... | G07F 9/002 |

* cited by examiner

100

403 — Receive Transaction Request

406 — Authorize Transaction

409 — Provide Payment Associated With Transaction to Requesting Entity

412 — Generate Payment Confirmation Data

415 — Broadcast Payment Confirmation Data

418 — Verify Authorization Received

400

PRIVACY-PRESERVING DECENTRALIZED PAYMENT INSTRUMENT NETWORK

BACKGROUND

When a user engages in a transaction with a provider of goods or services, the consumer can use a payment instrument (e.g., credit card) that is associated with an payment issuing service (e.g., issuer) to pay for the goods or services associated with the transaction. In this case, the user has entered into an agreement with the issuer such that the issuer agrees to pay the provider of goods or services on behalf of the user. Typically, in these situations, the provider of goods and services may receive authorization from the issuer to enter into the transaction, and the issuer pays the provider for the outstanding balance associated with the transaction.

In some cases, the issuer may authorize the transaction, but for various reasons, fails to provide payment to the provider resulting in a dispute between the parties. In resolving the dispute, multiple resources, such as, for example, third-party arbitrators, a complex network setup, an intermediator, and a financial instrument network operator, may be required to fully dissect the issues associated with the outstanding dispute. Furthermore, the transaction data may be shared among the various parties and resources associated with the dispute resolution. As such, the consumer's personal data may become vulnerable to loss of protection and privacy.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing a privacy-preserving decentralized network that allows providers of goods and services and transaction account issuers to record transaction-related information in a distributed ledger. In particular, upon receiving authorization from a transaction account issuer to proceed with a transaction, a merchant can securely record transaction data (e.g., a transaction confirmation identifier, transaction details, etc.) associated with the transaction in the distributed ledger. Furthermore, upon payment by the issuer to the merchant with regard to the transaction, the issuer can record payment confirmation data on the distributed ledger.

According to various embodiments, the data recorded by the merchant and the issuer can be encrypted and decrypted using private/public key-pairs where the merchant and the issuer have knowledge of each other's public keys. Accordingly, as disputes arise, the transaction data can be easily accessed on the distributed ledger by the other party. For example, if the merchant wants to confirm that payment has been sent by the issuer, the merchant can determine if the payment confirmation data has been recorded on the distributed ledger. As such, if the payment confirmation data is not stored in the distributed ledger, the merchant can determine that the issuer has not paid the merchant and can demand payment from the issuer. In addition, due to the privacy features in the decentralized payment instrument network, only the involved parties can have access to the corresponding transaction data.

Figure 1:
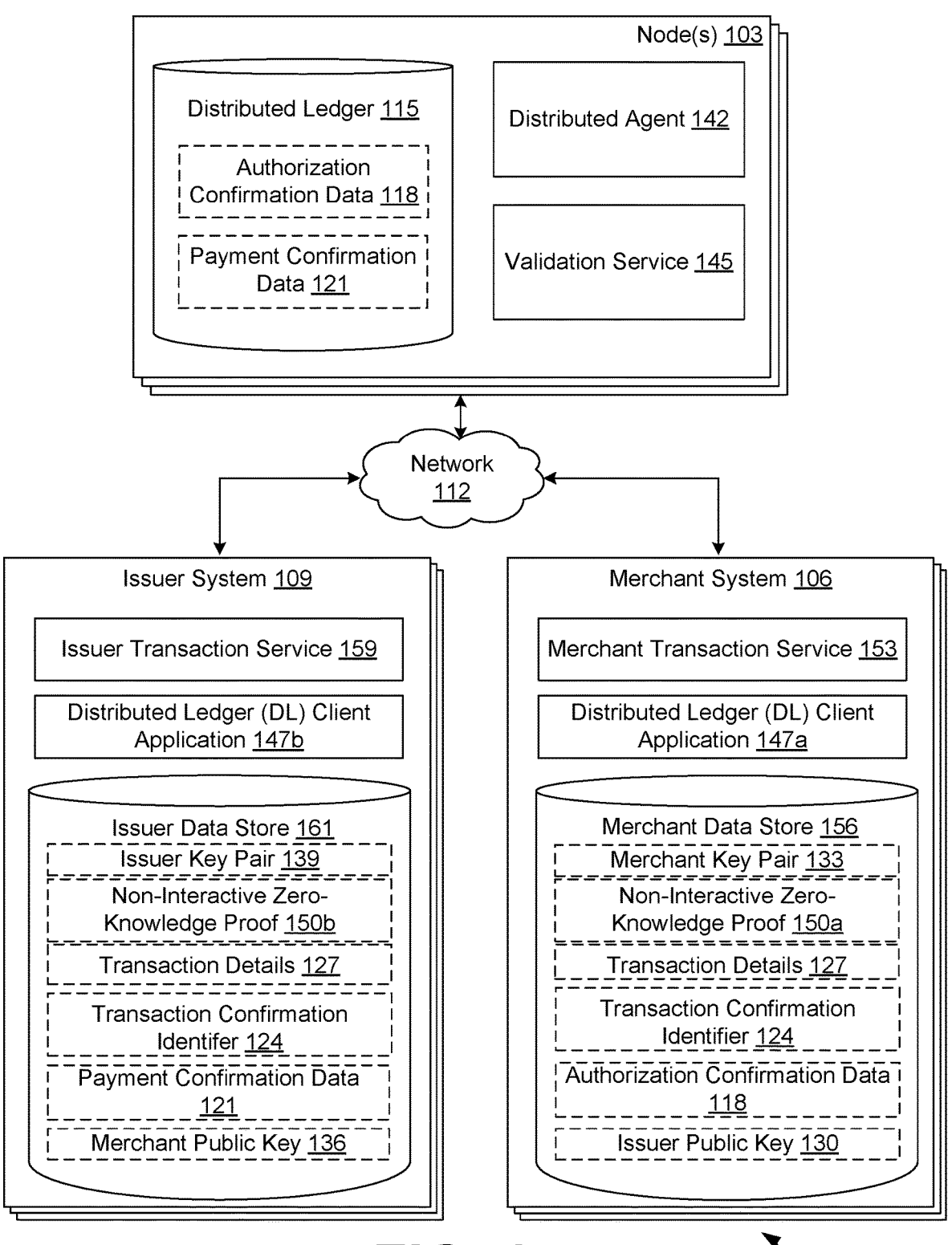
FIG. 1 is a drawing of a network environment according to various embodiments of the present disclosure.

With reference to FIG. 1, shown is a network environment 100 according to various embodiments. The network environment 100 includes a plurality of nodes 103, a merchant system 106, and issuer system 109, which are in data communication with each other via a network 112. The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

A node 103 can be a computer system or device that includes a processor, a memory, a network interface, and various other hardware. Such a computer system may be embodied in the form of a desktop computer, a laptop computer, server computer, or other devices providing computing capability. In some instances, the merchant system 106 and the issuer system 109 can be a node 103. Each node 103 can contain a replicated copy of a distributed ledger 115, including all data stored in the distributed ledger 115.

The distributed ledger 115 represents a synchronized, eventually consistent, data store spread across multiple nodes 103, some or all of which may be in different geographic or network locations. Records of transactions involving the distributed ledger 115 can be shared or replicated using a peer-to-peer network connecting the individual nodes 103 that can write to the distributed ledger 115. Once a transaction or record is recorded in the distributed ledger 115, it can be replicated across the peer-to-peer network until the record is eventually recorded with all of the nodes 103. Various consensus methods can be used to ensure that data is written reliably to the distributed ledger 115. Examples of a distributed ledger can include blockchains, distributed hash tables (DHTs), and similar data structures.

Various data can also be stored in a distributed ledger 115. This can include authorization confirmation data 118, payment confirmation data 121, and/or other information. However, any other data discussed in the present disclosure could also be stored in the distributed ledger 115 if the public availability of the data were acceptable in that particular implementation.

The authorization confirmation data 118 includes data provided by the merchant system 106 following authorization by the issuer system 109 to conduct a given transaction. For example, the authorization confirmation data 118 includes data generated by the merchant system 106 that identifies a transaction confirmation identifier 124, transaction details 127 (e.g., transaction account number, transaction account holder data, amount of transaction, etc.), an issuer public key 130 that can be used to encrypt the authorization confirmation data 118, and/or other data.

According to various embodiments, the authorization confirmation data 118 can take the form of a hashed memo or a cryptogram that is hashed using a hashing algorithm by the merchant system 106. The cryptogram could represent an encrypted version of the authorization confirmation data 118. For example, the authorization confirmation data 118 can be encrypted using a private key of a private/public merchant key-pair 133 associated with the merchant system 106. The merchant key-pair 133 can be generated by the merchant system 106, the issuer system 109, and/or other computing system capable of generating a key-pair.

In addition, the authorization confirmation data 118 can be signed using a private key of a transmission key-pair associated with the merchant system 106. The transmission key-pair can be unique to the merchant system 106 and can be used to store the authorization confirmation data 118 on the distributed ledger 115. The authorization confirmation data 118 can be used to verify that the transaction has been authorized by the issuer system 109 and that the authorization has been received by the merchant system 106. For example, the issuer system 109, the merchant system 106 or other entity with access to the transaction details can determine if the authorization confirmation data 118 is stored on the distributed ledger 115. If the authorization confirmation data 118 fails to exist on the distributed ledger 115, the merchant system 106 or issuer system 109 can conclude that the merchant system 106 did not receive authorization of the transaction from the issuer system 109.

The payment confirmation data 121 includes data provided by the issuer system 109 following payment of funds due to the merchant with respect to a given transaction. In particular, the payment confirmation data 121 can include the transaction confirmation identifier associated with the transaction, a merchant public key 136 of the merchant key-pair 133 and/or other data. The payment confirmation data 121 can be used to confirm that the issuer has provided payment to the merchant for the funds associated with the transaction.

According to various embodiments, the payment confirmation data 121 includes a hashed memo or cryptogram that includes the transaction confirmation identifier and/or other data. The memo can be hashed using a hashing algorithm by the issuer system 109. In addition, the payment confirmation data 121 can be encrypted using a merchant public key 136 known by the issuer system 109. The issuer key-pair 139 can be generated by the issuer system 109, the merchant system 106, and/or other computing system capable of generating a key-pair.

In addition, the payment confirmation data 121 can be signed using a private key of a transmission key-pair associated with the issuer system 109. The payment confirmation data 121 can be used to verify that the transaction has been authorized by the issuer system 109 and that the authorization has been received by the merchant system 106. For example, the issuer system 109, the merchant system 106 or other entity with access to the transaction details can determine if the payment confirmation data 121 for a given transaction is stored on the distributed ledger 115. If the payment confirmation data 121 fails to exist on the distributed ledger 115, the merchant system 106 or issuer system 109 can conclude that the issuer has not yet paid the merchant for funds due, with respect to the transaction.

Various applications and/or other functionality may be executed in the nodes 103 according to various embodiments. The components executed on the node 103, for example, include the distributed agent 142, the validation service 145, and other applications, services, processes, systems, engines, or functionality not discussed in detail herein.

The distributed agent 142 can represent a script or other executable which can be stored in the distributed ledger 115 on a node 103 and executed by individual hosts or peers (e.g., nodes 103) associated with the distributed ledger 115. When a computation is performed by the distributed agent 142, each host or peer that forms the distributed ledger 115 can perform the computation and compare its result with the results computed by other hosts or peers. When a sufficient number of hosts or peers forming the distributed ledger 115 agree on the result of the computation, the result can be stored in the distributed ledger 115. An example of a distributed agent 142 is a "smart contract" used in the ETHEREUM platform, although other distributed ledger or blockchain-based technologies provide the same or similar functionality.

According to various embodiments, a distributed agent 142 can receive a broadcast or request from a distributed ledger client application 147 (e.g., 147a, 147b) executed by the issuer system 109 or the merchant system 106. The broadcast or request can include authorization confirmation data 118, if received from the DL client application 147a of the merchant system 106, or payment confirmation data 121, if received from the DL client application 147b of the issuer system 109. Upon receiving the corresponding broadcast or request, the distributed agent 142 can write data associated with a given transaction to the distributed ledger 115.

The distributed agent 142 can further request a validation service 145 to validate the authorization confirmation data 118 or payment confirmation data 121 using a non-interactive zero-knowledge proof 150 (e.g., 150a, 150b) that is sent with the authorization confirmation data 118 by the merchant system 106 or with the payment confirmation data 121 by the issuer system 109. A zero-knowledge proof is a method by which a proving party (e.g., the merchant, the issuer) can prove to a verifying party (e.g., the verification service 145) that they are aware of a particular value while only providing to the verifying party the fact that they (e.g., the proving party) are aware of the value. As such, the proving party is in possession of information that is not provided to the verifying party, and the verifying party is able to prove that the value is what the proving party states is the value through a performance of the steps of the zero-knowledge proof. An interactive zero-knowledge proof requires interactions between the two-parties in order for the verifying party to validate the proof. In contrast, a non-interactive zero-knowledge proof is a method that allows the verifier to validate the proof without any type of interaction from the proving party.

The non-interactive zero-knowledge proof 150 of the present disclosure may allow the validation service 145 to validate or otherwise verify the transaction associated with the authorization confirmation data 118 or the payment confirmation data 121 without the merchant or the issuer needing to expose sensitive data associated with the transaction to the validation service 145 or other services or applications of the node 103.

For example, the authorization confirmation data 118 and the payment confirmation data 121 may each be encrypted and the validation service 145 may not have access to the private key or public key that can be used to decrypt the data for verification purposes. As such, without having any interaction with the merchant system 106 or the issuer system 109, the validation service 145 can validate various factors associated with the transaction without having knowledge of the factors based at least in part on the non-interactive zero-knowledge proof 150. According to various embodiments, the non-interactive zero-knowledge proof 150 provided by the merchant system 106 or the issuer system 109 may correspond to a non-interactive zero-knowledge proof algorithm such as, for example, zk-SNARKs.

According to various embodiments, the non-interactive zero-knowledge proof 150a provided by the merchant system 106 can be used by the validation service 145 to verify that (1) the merchant is in possession of the authorization confirmation data 118 (e.g., issuer public key 130, transaction details 127, and transaction confirmation identifier 124); (2) the merchant is in possession of the merchant private key of the merchant key-pair 133; (3) the authorization confirmation data 118 is indeed a hash of the memo or cryptogram that includes the issuer public key 130, transaction details 127, and transaction confirmation identifier 124; and/or (4) that the authorization confirmation data 118 does not already exist on the distributed ledger 115.

Similarly, the non-interactive zero-knowledge proof 150b provided by the issuer system 109 can be used by the validation service 145 to verify that (1) the distributed ledger 115 contains authorization confirmation data 118 that resolves the secret inputs provided by the non-interactive zero-knowledge proof 150b; (2) the issuer is in possession of the transaction confirmation identifier 124 as the payment confirmation data 121 corresponds to a hash of the transaction confirmation identifier 124; and/or (3) the payment confirmation data 121 is a settlement equivalent of the authorization confirmation data 118 provided by the merchant system 106.

The merchant system 106 is associated with a merchant (e.g., a seller, a supplier, etc.) that engages in a transaction with a customer with respect to the exchange of goods and services with a payment of funds. The issuer system 109 is associated with an issuer that can provide to the merchant a payment on behalf of the consumer. As such, the customer may have an established relationship with an issuer where the issuer has provided the customer with a transaction account number that the consumer can provide to the merchant for payment of the goods and/or services associated with the transaction.

The merchant system 106 is representative of a plurality of computing devices that can be coupled to the network 112. The merchant system 106 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability.

Various applications or other functionality can be executed by the merchant system 106 according to various embodiments. The components executed on a merchant system 106 can include a merchant transaction service 153, a distributed ledger (DL) client application 147a, and other applications, services, processes, systems, engines, or functionality not discussed in detail herein.

The merchant transaction service 153 can generate an authorization request that includes transaction details 127 for a given transaction and send the authorization request to the issuer transaction service 159 for approval or denial. In particular, when a consumer initiates a transaction with the merchant and offers to pay using the payment instrument provided by the issuer, the merchant transaction service 153 can generate the transaction details 127 to include the transaction account number associated with the payment instrument, the amount of the transaction, transaction account holder details, and/or other information that can be used by the issuer transaction service 159 to authorize or deny the given transaction.

The DL client application 147a can send or otherwise broadcast a request for the authorization confirmation data 118 to be written to the distributed ledger 115. The request or broadcast can be received by the nodes 103 associated with the distributed ledger 115. For example, the DL client application 147a can make an application programming interface (API) call that includes the authorization confirmation data 118 and the non-interactive zero-knowledge proof 150a. The API call can invoke the distributed agent 142 to verify the authorization confirmation data 118 and write the authorization confirmation data 118 to the distributed ledger 115.

Also, various data is stored in a merchant data store 156 that is accessible to the merchant system 106. The merchant data store 156 can be representative of a plurality of merchant data stores 156, which can include relational databases, object-oriented databases, hierarchical databases, hash tables or similar key-value data stores, as well as other data storage applications or data structures. The data stored in the merchant data store 156 is associated with the operation of the various applications or functional entities described below. This data can include the merchant key-pair 133, a zero-knowledge proof 150a, transaction details 127, a transaction confirmation identifier 124, authorization confirmation data 118, an issuer public key 130, and potentially other data.

The merchant key-pair 133 can correspond to an asymmetric cryptographic key-pair that can be used to verify transactions associated with the issuer system 109. In particular the merchant key-pair 133 can include a merchant private key and a merchant public key 136. The cryptographic keys in the key-pair can be used by an entity or user to confirm or otherwise authenticate their relationship with or control over the authorization confirmation data 118 stored in the distributed ledger 115. For example, the issuer system 109 can have knowledge of the merchant public key 136 based at least in part on an established relationship or agreement between the two entities. The merchant public key 130 can be used to encrypt the payment confirmation data 121 which can be decrypted by the merchant system 106 using the merchant private key of the merchant key-pair 133. The key-pair can be generated using various approaches, such as elliptic curve cryptography (ECC) approaches or using the Rivest-Shamir-Adleman (RSA) algorithm.

The non-interactive zero-knowledge proof 150a can correspond to a non-interactive zero-proof knowledge algorithm that allows the validation service 145 to verify transaction details known to the merchant system 106 with respect to a given transaction, without the merchant system 106 having to provide any other information to the validation service 145 other than a possession of knowledge of the transaction details. For example, the non-interactive zero-knowledge proof 150a can be used by the verification service 145 to verify that (1) the merchant is in possession of the authorization confirmation data 118 (e.g., issuer public key 130, transaction details 127, and transaction confirmation identifier 124); (2) the merchant is in possession of the merchant private key of the merchant key-pair 133; (3) the authorization confirmation data 118 is indeed a hash of the memo or cryptogram that includes the issuer public key 130, transaction details 127, and transaction confirmation identifier 124; and/or (4) that the authorization confirmation data 118 does not already exist on the distributed ledger 115. When broadcasting the authorization confirmation data 118 to the distributed ledger 115, the distributed ledger client application 147a can further broadcast the non-interactive zero-knowledge proof 150a to allow for validation of the authorization confirmation data 118 prior to writing the authorization confirmation data 118 to the distributed ledger 115.

The transaction details 127 correspond to various details related to a given transaction. For example, the transaction details 127 can include a transaction account number, a transaction amount, transaction account holder information, and/or other details associated with the given transaction. The merchant transaction service 153 can provide the transaction details 127 to the issuer transaction service 159 executed by the issuer system 109 when requesting authorization for the given transaction.

The transaction confirmation identifier 124 corresponds to an identifier generated by and received from the issuer system 109 to uniquely indicate and identify authorization of the requested transaction. The transaction confirmation identifier 124 can include a numeric number, an alphanumeric number, a token, and/or other type of identifier that can be used to uniquely identify the authorization of a given transaction.

The issuer public key 130 is part of the issuer key-pair 139 associated with the issuer system 109. In particular, the issuer public key 130 can be used to encrypt authorization confirmation data 118 written to the distributed ledger 115 that is broadcasted by the merchant system 106. The possession of the issuer public key 130 by the merchant system 106 can indicate an established trusted relationship between a merchant and the issuer.

The issuer system 109 is representative of a plurality of computing devices that can be coupled to the network 112. The issuer system 109 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability.

Various applications or other functionality can be executed by the issuer system 109 according to various embodiments. The components executed on an issuer system 109 can include an issuer transaction service 159, a distributed ledger client application 147b, and other applications, services, processes, systems, engines, or functionality not discussed in detail herein.

The issuer transaction service 159 can receive a transaction authorization request from the merchant transaction service 153 and can authorize or deny the transaction request. The request may include transaction details 127 for a given transaction. Using the transaction details 127 included in the request, the issuer transaction service 159 may confirm that funds or credit is available for a given payment instrument such that the payment transaction is authorized to proceed. Further, the issuer transaction service 159 may perform its own risk analysis to determine whether to authorize or deny the payment transaction. Upon authorization of the transaction, the issuer transaction service 159 can generate a transaction confirmation identifier 124 and send the transaction confirmation identifier 124 to the merchant transaction service 153.

The DL client application 147b can send or otherwise broadcast a request for the payment confirmation data 121 to be written to the distributed ledger 115. The request or broadcast can be received by the nodes 103 associated with the distributed ledger 115. For example, the DL client application 147b can make an application programming interface (API) call that includes the authorization confirmation data 118 and the non-interactive zero-knowledge proof 150b. The API call can invoke the distributed agent 142 to verify the payment confirmation data 121 and write the payment confirmation data 121 to the distributed ledger 115.

Also, various data is stored in an issuer data store 161 that is accessible to the issuer system 109. The issuer data store 161 can be representative of a plurality of issuer data stores 161, which can include relational databases, object-oriented databases, hierarchical databases, hash tables or similar key-value data stores, as well as other data storage applications or data structures. The data stored in the merchant data store 156 is associated with the operation of the various applications or functional entities described below. This data can include an issuer key-pair 139, a zero-knowledge proof 150b, the transaction details 127, the transaction confirmation identifier 124, payment confirmation data 121, the merchant public key 136, and potentially other data.

Figure 2A:
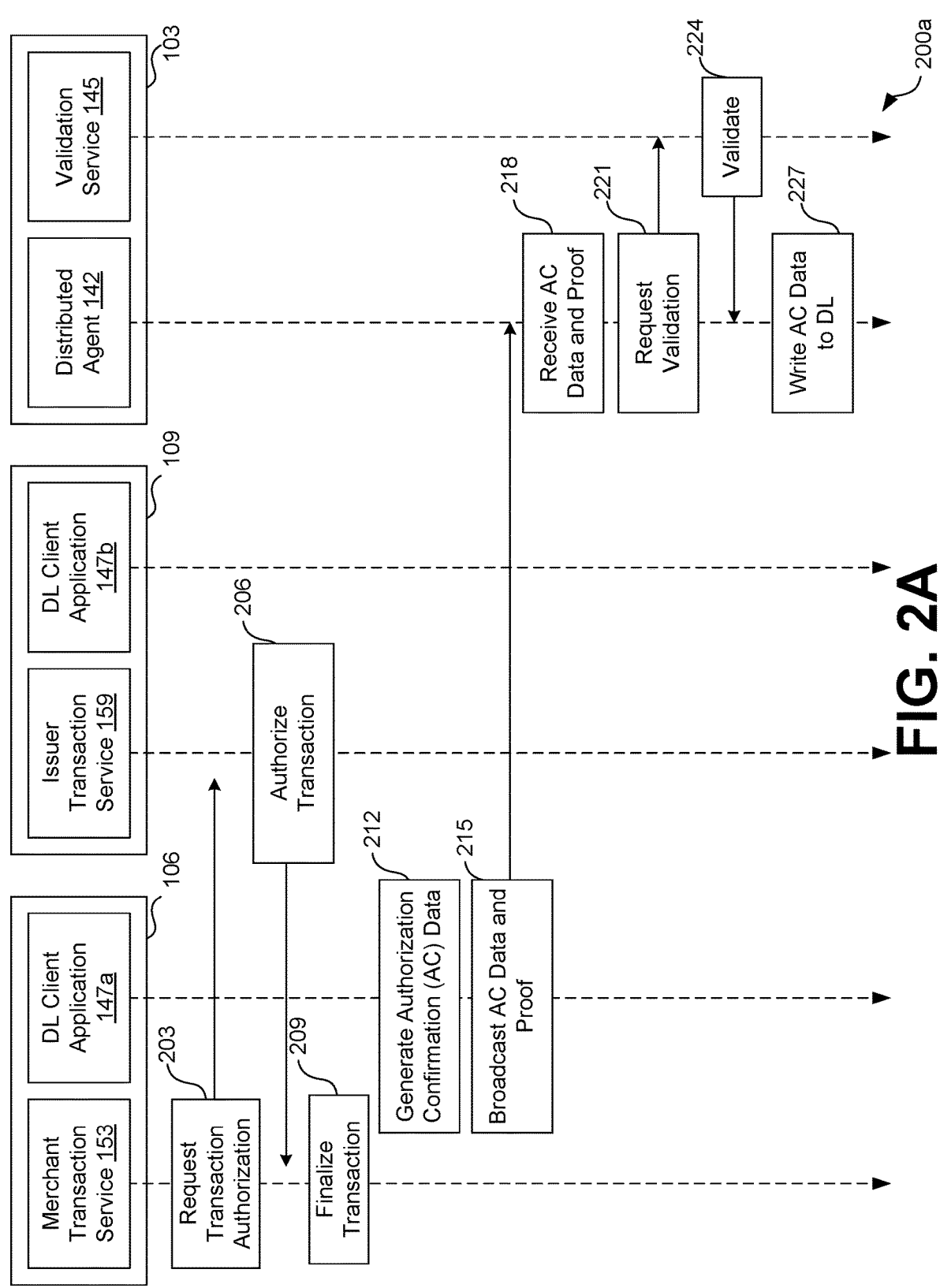
FIGS. 2A and 2B are sequence diagrams illustrating examples of functionality implemented as portions of the network environment of FIG. 1 according to various embodiments of the present disclosure.
Figure 2B:
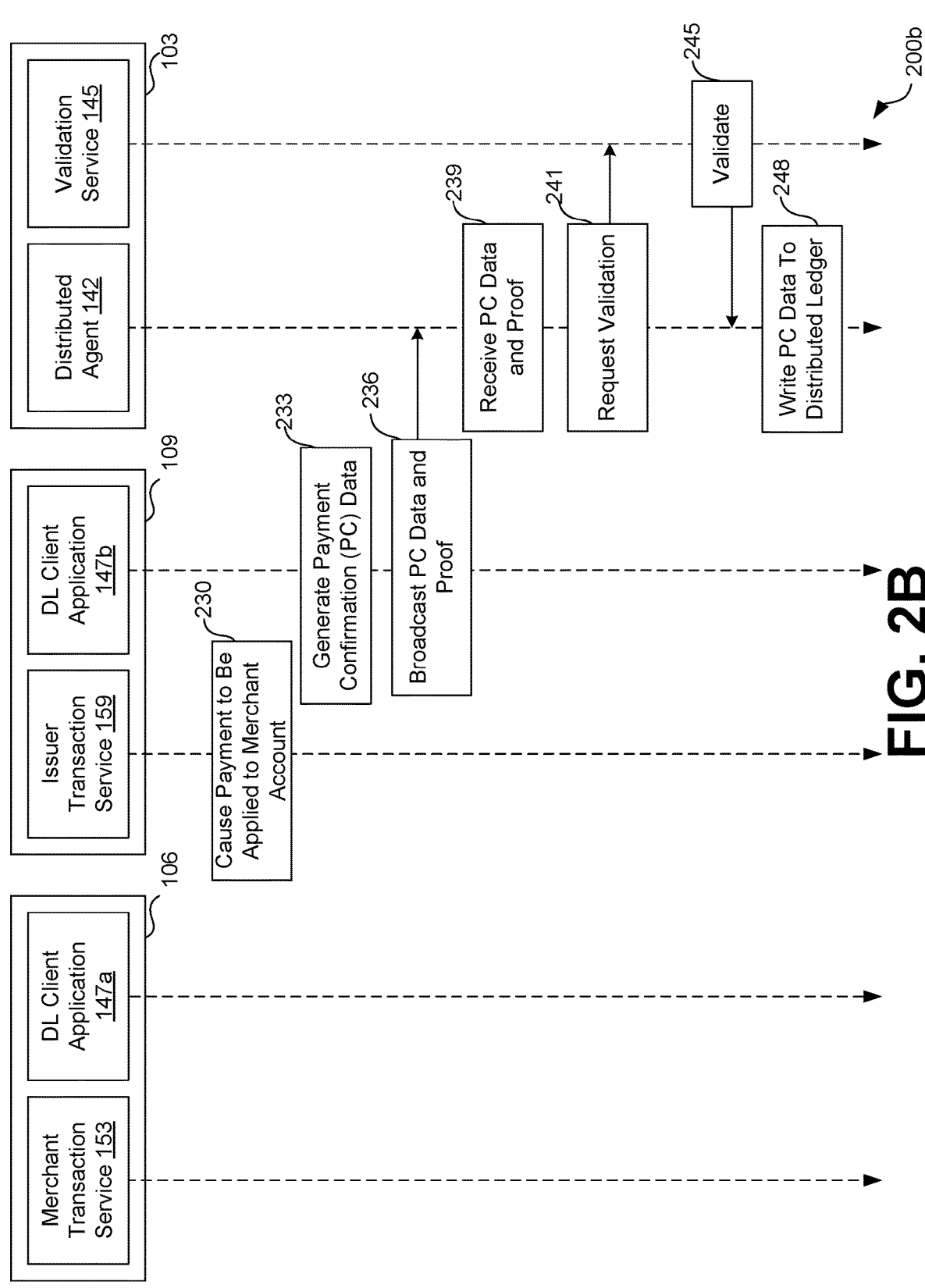

Turning now to FIGS. 2A-2B, shown are sequence diagrams 200a, 200b that provide an example of the operation of the components of the network environment 100. It is understood that the sequence diagrams of FIGS. 2A-2B provide merely an example of the many different types of functional arrangements that can be employed to implement the operation of the depicted portion of the network environment 100. As an alternative, the sequence diagrams of FIGS. 2A-2B can be viewed as depicting an example of elements of a method implemented within the network environment 100. In particular, the sequence diagrams of FIGS. 2A and 2B depict the functionality associated with the merchant system 106 and the issuer system 109 conducting a transaction and recording authorization confirmation data 118 and payment confirmation data 121 corresponding to the transaction on the distributed ledger 115.

To begin, a user may have a transaction account with an issuer that allows the issuer to make payments to a merchant (e.g., seller, supplier of goods/services, etc.) on behalf of the user. According to various embodiments, the issuer and the merchant can have an agreement with one another such that the merchant trusts that the issuer will provide the funds to the merchant upon authorization of the transaction by the issuer. When a user having a transaction account with an issuer enters into a transaction with a merchant to purchase goods or services provided by the merchant, the user can present the payment instrument associated with the transaction account to the merchant for processing the payment. For example, the user may provide a transaction account number to the merchant through the form of a credit card or other type of payment instrument when requested for payment for the goods or services provided by the merchant.

Upon receiving the transaction account number associated with a given transaction, the merchant transaction service 153 of the merchant system 106 can generate transaction details 127 associated with the transaction. The transaction details 127 can include the transaction account number provided by the user, the transaction amount, transaction account holder information (e.g., name, address, phone number, etc.) and/or other information.

At step 203, the merchant transaction service 153 sends a transaction authorization request to the issuer transaction service 159 of the issuer system 109 for authorization of the transaction. For example, the merchant transaction service 153 can generate the transaction authorization request and transmit the transaction authorization request to the issuer transaction service 159 through a wired or wireless connection over the network 112. In other examples, the merchant transaction service 153 can send the transaction authorization request to the issuer transaction service 159 by broadcasting the transaction authorization request to the issuer transaction service 159 or any other intermediary system that is in communication with the issuer transaction service 159.

At step 206, the issuer transaction service 159 authorizes the transaction. In particular, the issuer transaction service 159 can receive a transaction authorization request from the merchant transaction service 153 and can authorize or deny the transaction request. Using the transaction details 157 included in the request, the issuer transaction service 159 may confirm that funds or credit are available for a given payment instrument prior to authorizing or permitting the payment transaction to proceed. Further, the issuer transaction service 159 may perform its own risk analysis (e.g., fraud detection, etc.) to determine whether to authorize or deny the payment transaction. Upon authorization of the transaction, the issuer transaction service 159 can generate a transaction confirmation identifier 124 and send the transaction confirmation identifier 124 to the merchant transaction service 153 to indicate authorization of the transaction.

At step 209, the merchant transaction service 153 can finalize the transaction with the user. For example, the merchant transaction service 153 can indicate that payment has been received such that the user is provided access to the goods and/or services. In addition, the merchant transaction service 153 can request that the issuer system 109 via the issuer transaction service 159 or other service make the payment associated with the transaction to the merchant. In some embodiments, finalizing the transaction can further include instructing the DL client application 147a to create and broadcast the authorization confirmation data 118 to the distributed ledger 115.

At step 212, upon receiving the authorization of the transaction from the issuer system 109, the DL client application 147a generates the authorization confirmation data 118 that includes the issuer public key 130, the transaction details 127, and the transaction confirmation identifier 124 associated with the given transaction. According to various embodiments, the authorization confirmation data 118 can be encrypted using the issuer public key 130 that is known by the merchant system 106. In addition, the authorization confirmation data 118 can be hashed using a hashing algorithm. According to various embodiments, the authorization confirmation data 118 is signed using a private key of a transmission key-pair associated with the merchant system 106. The public key of the transmission key-pair can be made public via the distributed ledger 115 and can be used to write the authorization confirmation data 118 to the distributed ledger 115.

At step 215, the DL client application 147a broadcasts the authorization confirmation data 118 and the non-interactive zero-knowledge proof 150a or otherwise sends a request including the authorization confirmation data 118 and the non-interactive zero-knowledge proof 150a to the nodes 103 requesting that the authorization confirmation data 118 be written to the distributed ledger 115. For example, the DL client application 147a can transmit, over a wired or wireless connection over the network 112, the authorization confirmation data 118 and the non-interactive zero-knowledge proof 150 to the nodes 103 associated with the distributed ledger 115.

At step 218, the distributed agent 142 receives the authorization confirmation data 118 and the non-interactive zero-knowledge proof 150a. For example, one or more of the nodes 103 can receive the authorization confirmation data 118 and the non-interactive zero-knowledge proof 150a. Upon receipt of the authorization confirmation data 118 and the non-interactive zero-knowledge proof 150a, the recipient nodes 103 can begin the process of writing the authorization confirmation data 118 to the distributed ledger 115.

At step 221, the distributed agent 142 requests validation of the write request to the validation service 145. For example, the distributed agent 142 can send a request to the validation service 145, that upon receipt, indicates to the validation service 145 that the non-interactive zero-knowledge proof 150a is to be validated prior to being written to the distributed ledger 115. The request can include the non-interactive zero-knowledge proof 150a provided by the merchant system 106.

At step 224, the validation service 145 validates the write request and corresponding authorization confirmation data 118 provided by the merchant system 106. The non-interactive zero-knowledge proof 150a can be used by the validation service 145 to validate or otherwise verify the transaction associated with the authorization confirmation data 118 and/or factors associated with the transaction without the merchant needing to expose sensitive data (e.g., details of the authorization confirmation data 118) to the validation service 145.

According to various embodiments, the non-interactive zero-knowledge proof 150a provided by the merchant system 106 can be used by the validation service 145 to verify that (1) the merchant is in possession of the authorization confirmation data 118 (e.g., issuer public key 130, transaction details 127, and transaction confirmation identifier 124); (2) the merchant is in possession of the merchant private key of the merchant key-pair 133; (3) the authorization confirmation data 118 is indeed a hash of the memo or cryptogram that includes the issuer public key 130, transaction details 127, and transaction confirmation identifier 124; and/or (4) that the authorization confirmation data 118 does not already exist on the distributed ledger 115.

At step 227, the distributed agent 142 can cause the authorization confirmation data 118 to be written to the distributed ledger 115. For example, following verification of the authorization confirmation data 118 based at least in part on the non-interactive zero-knowledge proof 150a, the distributed agent 142 of the corresponding node 103 can write the authorization confirmation data 118 in the distributed ledger 115. Once the authorization confirmation data 118 is recorded in the distributed ledger 115, it can be replicated across the peer-to-peer network until the authorization confirmation data 118 is eventually recorded with all of the nodes 103. Various consensus methods can be used to ensure that data is written reliably to the distributed ledger 115.

At step 230, the issuer transaction service 159 can cause the payment associated with the transaction to be applied to the merchant account. For example, upon authorization of the transaction and finalization of the transaction by the merchant, the issuer system 109 can provide the payment associated with the transaction amount of the transaction to the merchant bank account or other payment receiving entity associated with the merchant in the merchant system 106.

At step 233, upon making the payment of the funds associated with the transaction to the merchant, the DL client application 147*b* generates the payment confirmation data 121 using the transaction confirmation identifier 124 associated with the given transaction. According to various embodiments, the payment confirmation data 121 can be encrypted using the merchant public key 136. In addition, the payment confirmation data 121 can be hashed using a hashing algorithm. According to various embodiments, the payment confirmation data 121 is signed using a private key of a transmission key-pair associated with the issuer system 109. The public key of the transmission key-pair can be made public via the distributed ledger 115 and can be used to write the payment confirmation data 121 to the distributed ledger 115.

At step 236, the DL client application 147*b* broadcasts the payment confirmation data 121 and the non-interactive zero-knowledge proof 150*b*. For example, the DL client application 147*b* sends a request including the payment confirmation data 121 and the non-interactive zero-knowledge proof 150*b* to the nodes 103 requesting that the payment confirmation data 121 be written to the distributed ledger 115.

At step 239, the distributed agent 142 receives the payment confirmation data 121 and the non-interactive zero-knowledge proof 150*b*. For example, one or more of the nodes 103 can receive the payment confirmation data 121 and the non-interactive zero-knowledge proof 150*b* and can begin the process of writing the payment confirmation data 121 to the distributed ledger 115.

At step 241, the distributed agent 142 requests validation of the write request to the validation service 145. The request can include the non-interactive zero-knowledge proof 150*b* provided by the issuer system 109.

At step 245, the validation service 145 validates the write request and corresponding payment confirmation data 121 provided by the issuer system 109. The non-interactive zero-knowledge proof 150*b* can be used by the validation service 145 to validate or otherwise verify the transaction associated with the payment confirmation data 121 and/or factors associated with the transaction without the issuer needing to expose sensitive data (e.g., details of the payment confirmation data 121) to the validation service 145.

According to various embodiments, the non-interactive zero-knowledge proof 150*b* provided by the issuer system 109 can be used by the validation service 145 to verify that (1) the distributed ledger 115 contains authorization confirmation data 118 that resolves the secret inputs provided by the non-interactive zero-knowledge proof 150*b*; (2) the issuer is in possession of the transaction confirmation identifier 124 as the payment confirmation data 121 corresponds to a hash of the transaction confirmation identifier 124; and/or (3) the payment confirmation data 121 is a settlement equivalent of the authorization confirmation data 118 provided by the merchant system 106.

At step 248, the distributed agent 142 can cause the payment confirmation data 121 to be written to the distributed ledger 115. For example, the distributed agent 142 corresponding to the validation service 145 that was first to verify the authorization confirmation data 118 based at least in part on the non-interactive zero-knowledge proof 150*a* can store the payment confirmation data 121 in the distributed ledger 115 of the corresponding node 103. Once the payment confirmation data 121 is recorded in the distributed ledger 115, it can be replicated across the peer-to-peer network until the authorization confirmation data 118 is eventually recorded with all of the nodes 103. Thereafter, this portion of the process proceeds to completion.

Figure 3:
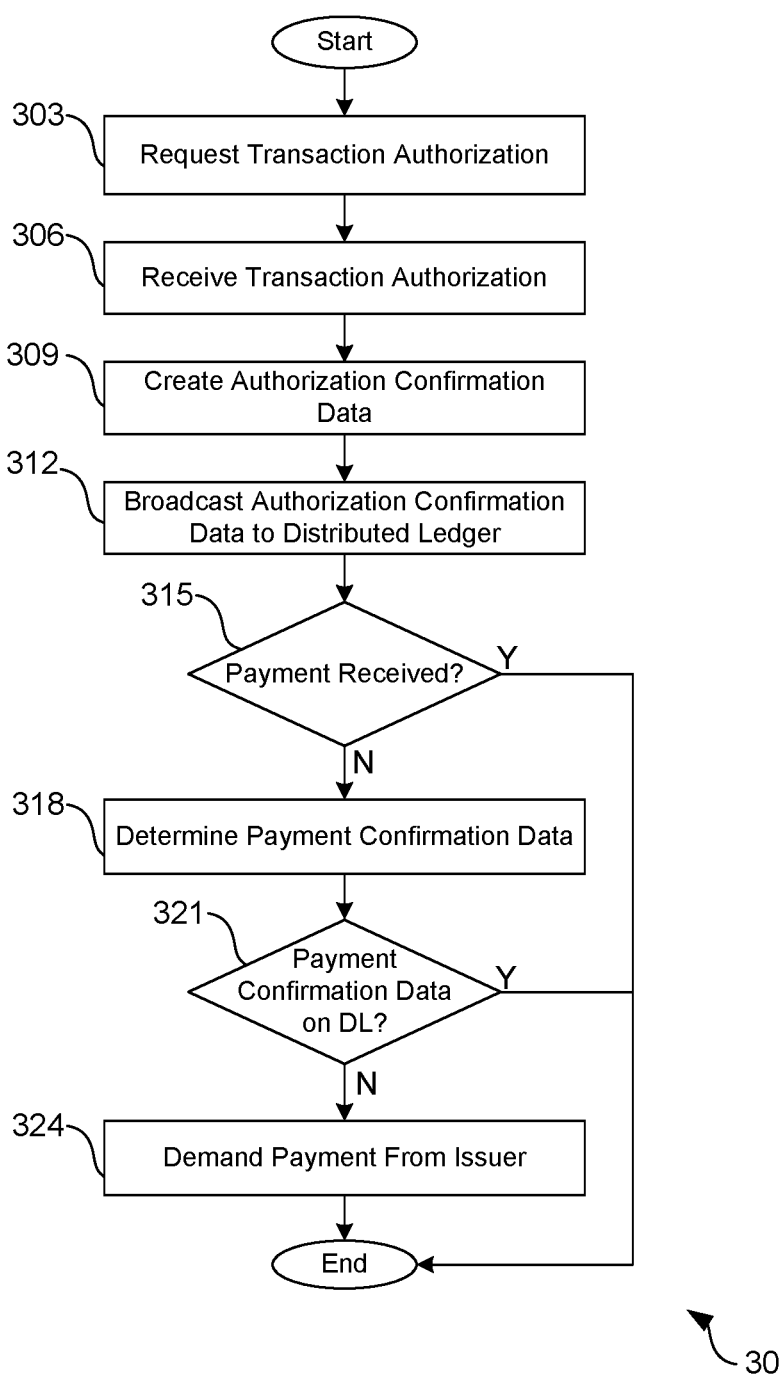
FIGS. 3 and 4 are flowcharts illustrating examples of functionality implemented as portions of the network environment of FIG. 1 according to various embodiments of the present disclosure.

Referring next to FIG. 3, shown is a flowchart 300 that provides one example of the operation of portions of the merchant transaction service 153, DL client application 147*a* and/or other service executed by the merchant system 106. It is understood that the flowchart of FIG. 3 provides merely an example of the many different types of functional arrangements that can be employed to implement the operation of the depicted portions of the merchant transaction service 153 and the DL client application 147*a*.

Beginning with box 303, the merchant transaction service 153 requests authorization for a given transaction. For example, the merchant transaction service 153 sends a transaction authorization request to the issuer transaction service 159 of the issuer system 109 for authorization of the transaction. The transaction authorization request can be sent to the issuer transaction service 156 via a wired or wireless connection over the network 112. The request can include transaction details 157 associated with the transaction.

At box 306, the merchant transaction service 153 receives authorization from the issuer system 109 to proceed with the transaction. The authorization can be received from the issuer system 109 via a wired or wireless connection over the network 112. According to various embodiments, the authorization can include a transaction confirmation identifier 124 that is unique to the given transaction.

At box 309, the DL client application 147*a* generates the authorization confirmation data 118 that includes the issuer public key 130, the transaction details 127, and the transaction confirmation identifier 124 associated with the given transaction. According to various embodiments, the authorization confirmation data 118 can be encrypted using the issuer private key 130 known by the merchant system 106. In addition, the authorization confirmation data 118 can be hashed using a hashing algorithm. According to various embodiments, the authorization confirmation data 118 is signed using a private key of a transmission key-pair associated with the merchant system 106. The public key of the transmission key-pair can be made public via the distributed ledger 115 and can be used to write the authorization confirmation data 118 to the distributed ledger 115.

At box 312, the DL client application 147*a* broadcasts the authorization confirmation data 118 and the non-interactive zero-knowledge proof 150*a*. For example, the DL client application 147*a* can send a request including the authorization confirmation data 118 and the non-interactive zero-knowledge proof 150*a* to the nodes 103 requesting that the authorization confirmation data 118 be written to the distributed ledger 115.

At box 315, the merchant transaction service 153 can determine if the payment associated with the transaction has been received from the issuer. For example, the merchant transaction service 153 can determine if the appropriate funds associated with the transaction were received in the merchant receiving account or other type of receiving account associated with the merchant as can be appreciated. If the payment is determined to be received, the process proceeds to completion. Otherwise, the process proceeds to box 318.

At box 318, the DL client application 147*a* can determine the hashed payment confirmation data 121 that is to be stored in the distributed ledger 115. In particular, the DL client application 147*a* can generate the hashed payment confirmation data 121 based at least in part on the transaction confirmation identifier 124. In addition, the DL client application 147*a* may be able to access the public key of the transmission key-pair of the issuer that was used to store the payment confirmation data 121 on the distributed ledger.

At box 321, the DL client application 147*a* can determine if the payment confirmation data 121 is stored in the distributed ledger 115. For example, the DL client application 147*a* can instantiate an API call or other type of request to the distributed agent 142 to determine if the payment confirmation data 121 associated with the transaction has been stored in the distributed ledger 115. The request can include any information such as, the payment confirmation data 121, the public key of the transmission key-pair associated with the issuer, the issuer public key 130, and/or any other data that can be used to identify the payment confirmation data 121 on the distributed ledger 115. If the payment confirmation data 121 is stored on the distributed ledger 115, this portion of the process proceeds to completion. Otherwise, the process proceeds to box 324.

At box 324, the DL client application 147*a* can demand payment from the issuer. For example, if the payment confirmation data 121 fails to exist on the distributed ledger 115 it can be assumed that the issuer never provided payment for the transaction. As such, without a third-party resolution or involvement, the merchant system 106 can determine lack of payment by the issuer and demand the payment from the issuer while preserving privacy data associated with the involved parties. Thereafter, this portion of the process proceeds to completion.

Figure 4:
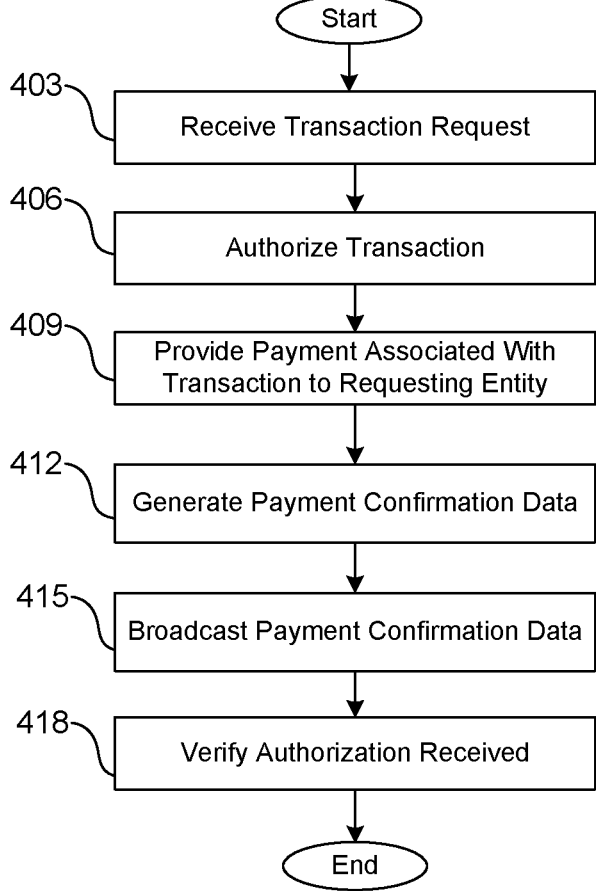

Referring next to FIG. 4, shown is a flowchart 400 that provides one example of the operation of portions of the issuer transaction service 159, the DL client application 147*b*, and/or other service executed by the issuer system 109. It is understood that the flowchart of FIG. 4 provides merely an example of the many different types of functional arrangements that can be employed to implement the operation of the depicted portions of the issuer transaction service 159 and the DL client application 147*b*.

Beginning with box 403, the issuer transaction service 159 receives a transaction authorization request from the merchant transaction service 153. The transaction authorization request can be received via a wired or wireless connection between the merchant system 106 and the issuer system 109 over the network 112. The transaction authorization request can include transaction details 127 associated with the transaction. The transaction details 127 can include the transaction account number, the amount of the transaction, transaction account holder information, and/or other information.

At box 406, the issuer transaction service 159 authorizes the transaction. In particular, the issuer transaction service 159 can receive a transaction authorization request from the merchant transaction service 153 over the network 112, and can authorize or deny the transaction request. Using the transaction details 157 included in the request, the issuer transaction service 159 may confirm that funds or credit are available for a given payment instrument such that the payment transaction is authorized to proceed. Further, the issuer transaction service 159 may perform its own risk analysis (e.g., fraud detection, etc.) to determine whether to authorize or deny the payment transaction. Upon authorization of the transaction, the issuer transaction service 159 can generate a transaction confirmation identifier 124 and send the transaction confirmation identifier 124 to the merchant transaction service 153 to indicate authorization of the transaction.

At box 409, the issuer transaction service 159 can cause the payment associated with the transaction to be applied to the merchant account. For example, upon authorization of the transaction and finalization of the transaction by the merchant, the issuer system 109 can provide the payment associated with the transaction amount of the transaction to the merchant bank account or other payment receiving entity associated with the merchant in the merchant system 106.

At step 412, the DL client application 147*b* generates the payment confirmation data 121 using the transaction confirmation identifier 124 associated with the given transaction. According to various embodiments, the payment confirmation data 121 can be encrypted using the merchant public key 136 that is known to the issuer system 109. In addition, the payment confirmation data 121 can be hashed using a hashing algorithm. According to various embodiments, the payment confirmation data 121 is signed using a private key of a transmission key-pair associated with the issuer system 109. The public key of the transmission key-pair can be made public via the distributed ledger 115 and can be used to write the payment confirmation data 121 to the distributed ledger 115.

At step 415, the DL client application 147*b* broadcasts the payment confirmation data 121 and the non-interactive zero-knowledge proof 150*b*. For example, the DL client application 147*b* can send a request over the network 112 to the nodes 103. The request can include the payment confirmation data 121 and the non-interactive zero-knowledge proof 150*b* to the nodes 103 requesting that the payment confirmation data 121 be written to the distributed ledger 115.

At step 418, the DL client application 147*b* can verify whether the authorization for the transaction was received. In particular, the DL client application 147*b* can instantiate an API call or other type of request to the distributed agent 142 to determine if the authorization confirmation data 118 associated with the transaction has been stored in the distributed ledger 115. The request can include any information such as the transaction confirmation identifier 124, the public key of the transmission key-pair associated with the merchant, the merchant public key 136, and/or any other data that can be used to identify the authorization confirmation data 118 on the distributed ledger 115. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a plurality of nodes comprising a distributed ledger; and at least one application executable by at least one of the plurality of nodes, wherein, when executed by the at least one of the plurality of nodes, the at least one application causes the at least one of the plurality of nodes to at least:

receive authorization confirmation data and a first zero-knowledge proof from a first entity following a second entity authorizing a transaction between a user account and the first entity, the authorization confirmation data being signed using a first private key of the first entity, and being encrypted using a second public key of the second entity, and comprising a set of transaction details that comprises a transaction account number and a transaction amount, and the system failing to have access to a corresponding first public key of the first entity and failing to have access to a corresponding second private key of the second entity to decrypt the authorization confirmation data;

execute the first zero-knowledge proof to determine whether a plurality of first factors exist without knowledge of sensitive information within the authorization confirmation data, the plurality of first factors comprising (1) the first entity possesses the authorization confirmation data, (2) the first entity possesses the first private key, (3) the authorization confirmation data comprises a corresponding second public key of the second entity, and (4) the authorization confirmation data fails to currently exist on the distributed ledger;

validate the authorization confirmation data in response to determining that the plurality of first factors exist;

write the authorization confirmation data to the distributed ledger;

receive payment confirmation data and a second zero-knowledge proof from the second entity following the second entity providing a payment associated with the transaction to the first entity, the payment confirmation data being signed using the second private key of the second entity, being encrypted using the first public key of the first entity, and comprising of a set of expected transaction details that comprises an expected transaction account number and an expected transaction amount, and the system failing to have access to the corresponding second public key of the second entity;

execute the second zero-knowledge proof to determine whether a plurality of second factors exists without knowledge of the plurality of second factors, the plurality of second factors comprising (1) the distributed ledger contains the authorization confirmation data that resolves secret inputs provided by the second zero-knowledge proof, (2) the first entity possesses a transaction confirmation identifier and the payment confirmation data corresponds to a hash of the transaction confirmation identifier, (3) the payment confirmation data is a settlement equivalent to the authorization confirmation data provided by the first entity, and (4) the expected transaction account number is equivalent to the transaction account number present in the authorization confirmation data;

validate the payment confirmation data in response to determining that the plurality of second factors exist; and write the payment confirmation data to the distributed ledger to indicate that the second entity has provided the payment associated with the transaction to the first entity.

2. The system of claim 1, wherein the authorization confirmation data comprises a hashed memo comprising the corresponding second public key of the second entity, one or more transaction details, and the transaction confirmation identifier associated with the transaction.

3. The system of claim 1, wherein the payment confirmation data comprises a hashed version of the transaction confirmation identifier associated with the transaction.

4. The system of claim 1, wherein, when executed, the at least one application further causes the at least one of the plurality of nodes to at least:

receive a request from the first entity to verify if the payment for the transaction has been processed;

confirm that the payment confirmation data is written on the distributed ledger; and notify the first entity that the payment confirmation data is on the distributed ledger.

5. The system of claim 1, wherein the payment confirmation data is written to the distributed ledger according to a consensus agreement by the plurality of nodes.

6. The system of claim 1, wherein the authorization confirmation data is written to the distributed ledger according to a consensus agreement by the plurality of nodes.

7. The system of claim 1, wherein the first entity possesses the corresponding second public key of the second entity and the second entity possesses the corresponding first public key of the first entity.

8. The system of claim 1, wherein, when executed, the at least one application further causes the at least one of the plurality of nodes to at least:

receive a request from the first entity to verify if the payment for the transaction has been processed;

confirm that the payment confirmation data fails to be written on the distributed ledger; and notify the first entity that the payment confirmation data fails to be written on the distributed ledger.

9. A method, comprising:

receiving, via at least one node of a plurality of nodes comprising a distributed ledger, authorization confirmation data and a first zero-knowledge proof from a first entity following a second entity authorizing a transaction between a user account and the first entity, the authorization confirmation data being signed using a first private key of the first entity, and being encrypted using a second public key of the second entity, and comprising a set of transaction details that comprises a transaction account number and a transaction amount, and the system failing to have access to a corresponding first public key of the first entity and failing to have access to a corresponding second private key of the second entity to decrypt the authorization confirmation data;

executing, via at least one node of the plurality of nodes, the first zero-knowledge proof to determine whether a plurality of first factors exist without knowledge of sensitive information within the authorization confirmation data, the plurality of first factors comprising (1) the first entity possesses the authorization confirmation data, (2) the first entity possesses the first private key, (3) the authorization confirmation data comprises a corresponding second public key of the second entity, and (4) the authorization confirmation data fails to currently exist on the distributed ledger;

validating, via at least one node of the plurality of nodes, the authorization confirmation data in response to determining that the plurality of first factors exist;

writing, via at least one node of the plurality of nodes, the authorization confirmation data to the distributed ledger;

receiving, via at least one node of the plurality of nodes, payment confirmation data and a second zero-knowledge proof from the second entity following the second entity providing a payment associated with the transaction to the first entity, the payment confirmation data being signed using the second private key of the second entity, being encrypted using the first public key of the first entity, and comprising of a set of expected transaction details that comprises an expected transaction account number and an expected transaction amount, and the system failing to have access to the corresponding second public key of the second entity;

executing, via at least one node of the plurality of nodes, the second zero-knowledge proof to determine whether a plurality of second factors exists without knowledge of the plurality of second factors, the plurality of second factors comprising (1) the distributed ledger contains the authorization confirmation data that resolves secret inputs provided by the second zero-knowledge proof, (2) the first entity possesses a transaction confirmation identifier and the payment confirmation data corresponds to a hash of the transaction confirmation identifier, (3) the payment confirmation data is a settlement equivalent to the authorization confirmation data provided by the first entity, and (4) the expected transaction account number is equivalent to the transaction account number present in the authorization confirmation data;

validating, via at least one node of the plurality of nodes, the payment confirmation data in response to determining that the plurality of second factors exist; and writing, via at least one node of the plurality of nodes, the payment confirmation data to the distributed ledger to indicate that the second entity has provided the payment associated with the transaction to the first entity.

10. The method of claim 9, wherein the authorization confirmation data comprises a hashed memo comprising the corresponding second public key of the second entity, one or more transaction details, and the transaction confirmation identifier associated with the transaction.

11. The method of claim 9, wherein the payment confirmation data comprises a hashed version of the transaction confirmation identifier associated with the transaction.

12. The method of claim 9, further comprising:

receiving a request from the first entity to verify if the payment for the transaction has been processed;

confirming that the payment confirmation data is written on the distributed ledger; and notifying the first entity that the payment confirmation data is on the distributed ledger.

13. The method of claim 9, wherein the first entity possesses the corresponding second public key of the second entity and the second entity possesses the corresponding first public key of the first entity.

14. The method of claim 9, further comprising:

receiving a request from the first entity to verify if the payment for the transaction has been processed;

confirming that the payment confirmation data fails to be written on the distributed ledger; and notifying the first entity that the payment confirmation data fails to be written on the distributed ledger.

15. A non-transitory, computer-readable medium, comprising machine-readable instructions that, when executed by a processor of at least one node of a plurality of nodes comprising a distributed ledger, cause the at least one node to at least:

receive authorization confirmation data and a first zero-knowledge proof from a first entity following a second entity authorizing a transaction between a user account and the first entity, the authorization confirmation data being signed using a first private key of the first entity, and being encrypted using a second public key of the second entity, and comprising a set of transaction details that comprises a transaction account number and a transaction amount, and the system failing to have access to a corresponding first public key of the first entity and failing to have access to a corresponding second private key of the second entity to decrypt the authorization confirmation data;

execute the first zero-knowledge proof to determine whether a plurality of first factors exist without knowledge of sensitive information within the authorization confirmation data, the plurality of first factors comprising (1) the first entity possesses the authorization confirmation data, (2) the first entity possesses the first private key, (3) the authorization confirmation data comprises a corresponding second public key of the second entity, and (4) the authorization confirmation data fails to currently exist on the distributed ledger;

validate the authorization confirmation data in response to determining that the plurality of first factors exist;

write the authorization confirmation data to the distributed ledger;

receive payment confirmation data and a second zero-knowledge proof from the second entity following the second entity providing a payment associated with the transaction to the first entity, the payment confirmation data being signed using the second private key of the second entity, being encrypted using the first public key of the first entity, and comprising of a set of expected transaction details that comprises an expected transaction account number and an expected transaction amount, and the system failing to have access to the corresponding second public key of the second entity;

execute the second zero-knowledge proof to determine whether a plurality of second factors exists without knowledge of the plurality of second factors, the plurality of second factors comprising (1) the distributed ledger contains the authorization confirmation data that resolves secret inputs provided by the second zero-knowledge proof, (2) the first entity possesses a transaction confirmation identifier and the payment confirmation data corresponds to a hash of the transaction confirmation identifier, (3) the payment confirmation data is a settlement equivalent to the authorization confirmation data provided by the first entity, and (4)

the expected transaction account number is equivalent to the transaction account number present in the authorization confirmation data;

validate the payment confirmation data in response to determining that the plurality of second factors exist; and write the payment confirmation data to the distributed ledger to indicate that the second entity has provided the payment associated with the transaction to the first entity.

16. The non-transitory, computer-readable medium of claim 15, wherein the authorization confirmation data comprises a hashed memo comprising the corresponding second public key of the second entity, one or more transaction details, and the transaction confirmation identifier associated with the transaction.

17. The non-transitory, computer-readable medium of claim 15, wherein the payment confirmation data comprises a hashed version of the transaction confirmation identifier associated with the transaction.

18. The non-transitory, computer-readable medium of claim 15, wherein the machine-readable instructions, when executed by the processor, further cause the at least one node to at least:

receive a request from the first entity to verify if the payment for the transaction has been processed;

confirm that the payment confirmation data is written on the distributed ledger; and notify the first entity that the payment confirmation data is on the distributed ledger.

19. The non-transitory, computer-readable medium of claim 15, wherein the first entity possesses the corresponding second public key of the second entity and the second entity possesses the corresponding first public key of the first entity.

20. The non-transitory, computer-readable medium of claim 15, wherein the machine-readable instructions, when executed by the processor, further cause the at least one node to at least:

receive a request from the first entity to verify if the payment for the transaction has been processed;

confirm that the payment confirmation data fails to be written on the distributed ledger; and notify the first entity that the payment confirmation data fails to be written on the distributed ledger.

\* \* \* \* \*